United States Patent
Gacoin et al.

(10) Patent No.: US 9,389,353 B2
(45) Date of Patent: Jul. 12, 2016

(54) METHOD OF MANUFACTURING A TRANSPARENT AND BIREFRINGENT THIN SOLID MINERAL LAYER AND OPTIC COMPONENT WITH A TRANSPARENT AND BIREFRINGENT THIN SOLID MINERAL LAYER

(71) Applicants: ECOLE POLYTECHNIQUE, Palaiseau (FR); CENTRE NATIONAL DE LA RECHERCHE SCIENTIFIQUE, Paris (FR)

(72) Inventors: Thierry Gacoin, Bures sur Yvette (FR); Jong Wook Kim, Palaiseau (FR); Khalid Lahlil, Orsay (FR); Jean-Pierre Boilot, Meudon (FR); Jacques Peretti, Paris (FR)

(73) Assignees: Ecole Polytechnique, Palaiseau (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 14/417,072

(22) PCT Filed: Jul. 23, 2013

(86) PCT No.: PCT/FR2013/051779
§ 371 (c)(1),
(2) Date: Jan. 23, 2015

(87) PCT Pub. No.: WO2014/016514
PCT Pub. Date: Jan. 30, 2014

(65) Prior Publication Data
US 2015/0205027 A1    Jul. 23, 2015

(30) Foreign Application Priority Data

Jul. 24, 2012   (FR) ..................................... 12 57185

(51) Int. Cl.
*G02B 5/30* (2006.01)
*B05D 3/12* (2006.01)

(52) U.S. Cl.
CPC ................ *G02B 5/3083* (2013.01); *B05D 3/12* (2013.01); *G02B 5/3016* (2013.01); *G02B 5/3041* (2013.01)

(58) Field of Classification Search
CPC .. G02B 5/3083; G02B 5/3016; G02B 5/3041; B05D 3/12
USPC ............. 359/489.07; 427/162, 171, 212, 215, 427/314, 356, 541; 977/813, 827, 834
See application file for complete search history.

(56) References Cited

U.S. PATENT DOCUMENTS

| | | | |
|---|---|---|---|
| 5,853,801 A * | 12/1998 | Suga ........................ | B05D 3/12 427/164 |
| 7,892,606 B2 * | 2/2011 | Thies .................... | C03C 17/007 427/162 |
| 2006/0093846 A1 * | 5/2006 | Chien ....................... | B32B 3/30 428/520 |

(Continued)

FOREIGN PATENT DOCUMENTS

| | | |
|---|---|---|
| EP | 1715365 A1 | 10/2006 |
| JP | 2009 104152 A | 5/2009 |
| JP | 2012 32623 A | 2/2012 |

OTHER PUBLICATIONS

Otto L. Muskens, et al., "Epitaxial Growth of Aligned Semiconductor Nanowire Metamaterials for Photonic Applications", Advanced Functional Materials, 2008, 7 pages.

*Primary Examiner* — Frank Font
(74) *Attorney, Agent, or Firm* — Baker & Hostetler LLP

(57) ABSTRACT

A method of fabricating a transparent and birefringent mineral solid thin layer comprises the following steps: a) preparing a colloidal solution constituted by anisotropic mineral nanoparticles in suspension in a dispersion liquid; b) depositing the colloidal solution on a surface of a substrate by spreading as a thin layer while applying directional shear stress tangentially to the surface of the substrate so as to deposit the colloidal solution as a liquid thin layer on the surface of the substrate, the value of the shear stress and the concentration of mineral nanoparticles in the colloidal solution being determined in such a manner as to cause the anisotropic mineral nanoparticles to be aligned along the direction of the shear stress tangential to the surface of the substrate; and c) drying the liquid thin layer by evaporating the dispersion liquid.

15 Claims, 3 Drawing Sheets

(56) References Cited

U.S. PATENT DOCUMENTS

2006/0255486 A1* 11/2006 Benson, Jr. ............ B29C 70/30
264/1.34

2007/0024970 A1* 2/2007 Lub .................... C09K 19/3852
359/487.02
2007/0254107 A1* 11/2007 Rao ........................ B82Y 30/00
427/372.2

* cited by examiner

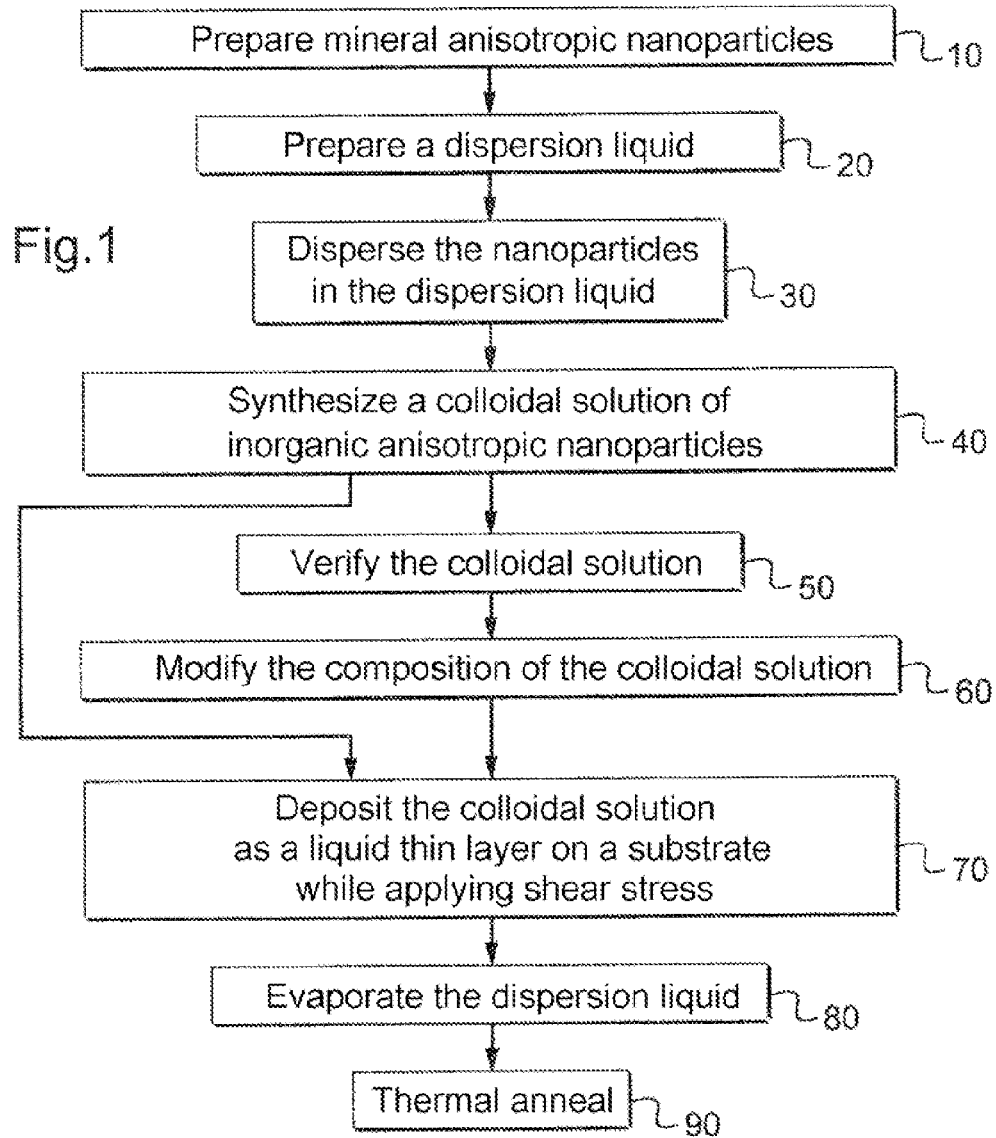
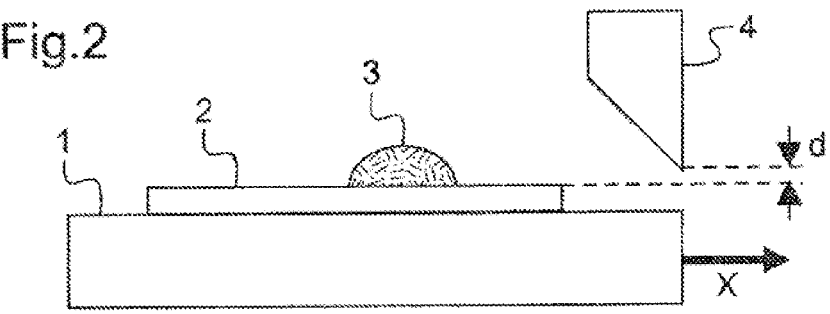

METHOD OF MANUFACTURING A TRANSPARENT AND BIREFRINGENT THIN SOLID MINERAL LAYER AND OPTIC COMPONENT WITH A TRANSPARENT AND BIREFRINGENT THIN SOLID MINERAL LAYER

CROSS-REFERENCE TO RELATED APPLICATIONS

This application is a National Stage of International patent application PCT/FR2013/051779, filed on Jul. 23, 2013, which claims priority to foreign French patent application No. FR 1257185, filed on Jul. 24, 2012, the disclosures of which are incorporated by reference in their entirety.

FIELD OF THE INVENTION

The present invention relates to fabricating birefringent thin layers that are inorganic (also referred to as "mineral") or organo-mineral hybrids. The invention also relates to inorganic optical plates that are birefringent and transparent in the ultraviolet (UV) and/or visible and/or infrared (IR) spectrum range.

BACKGROUND

Retardation plates are generally fabricated either from mineral monocrystals, which are expensive and poorly adapted to large areas, or else from organic polymer materials, such as polycarbonate. The thermal and photochemical stability of organic wave plates is low. Unfortunately, in certain applications, the use of a wave plate requires good stability relative to temperature or to a high flux of photons.

Furthermore, wave plates based on organic materials require sufficient thickness to form a plate having the desired optical retardation, for example, a quarterwave plate to generate optical retardation equal to $\lambda/4$, or a halfwave plate for retardation of $\lambda/2$, or indeed a wave plate for retardation equal to $\lambda$. The thickness of an organic wave plate generally has the effect of reducing the transmission coefficient of the wave plate, in particular in the UV range shorter than 350 nm.

Various methods have been proposed for replacing the organic polymer materials of wave plates with inorganic materials for the purpose of improving the technical stability of such wave plates.

The following documents (I. Hodgekinson and Qi hong Wu, "Serial bideposition of anisotropic thin films with enhanced linear birefringence", Appl. Optics, Vol. 38, No. 16, pp. 3621-3625; A. C. van Popta et al., "Birefringence enhancement in annealed $TiO_2$ thin films", Journ. Appl. Phys. 102, 013517, 2007; O. L. Mustens et al., "Epitaxial growth of aligned semiconductor nanowire metamaterials for photonic applications", Adv. Func. Mater. 2008, 18, pp. 1039-1046) are known, which describe the epitaxial growth of inorganic nanorods on an inclined substrate by chemical vapor deposition (CVD). The technique of epitaxy is known in the field of semiconductors. Nevertheless, epitaxial growth has the major drawback of causing nanorods to grow that are not parallel to the surface of the substrate. As a result, the geometrical anisotropy is not fully devoted to birefringence in the plane of the surface of the substrate. Transmitted light presents complex optical retardation behavior that depends strongly on the angle of incidence of the light. The birefringent films of nanorods that are obtained in that way generally present strong absorption or diffusion in the visible spectrum range. Furthermore, that method is difficult to apply industrially to producing film on large areas because of limits in terms both of substrate surface area and of cost.

Other techniques rely on using colloidal suspensions of anisotropic nanoparticles. The document (M. Mittal and E. M. Furst "Electrical field-directed convective assembly of ellipsoidal colloidal particles to create optically and mechanically anisotropic thin films", Adv. Func. Mater, 2009, 19, pp. 3271-3278) describes an assembly of particles directed by an electric field, which requires a complex deposition technique to be performed together with the application of a strong electric field.

The document (M. Mittal et al., "Flow-directed assembly of nanostructured thin films from suspensions of anisotropic titanium particles", Nanoscale 2010, 2, pp. 2237-2243) describes assembly directed by a flow of $TiO_2$ nanoparticles that is easy to perform, but in which orientation order is difficult to control. That technique does not make it possible to orient nanoparticles on a large area. Imperfect orientation of $TiO_2$ nanoparticles has the drawback of producing strong diffusion and of reducing the birefringent properties of the film.

The document (H. Miyata et al., "Remarkable birefringence in a $TiO_2$—$SiO_2$ composite film with an aligned mesoporous structure", J. Am. Chem. Soc. 2011, 133, pp. 13539-13544) describes fabricating a composite film having an aligned mesoporous structure. The film presents birefringence of 0.06 and good optical transmission due to the small size of the pores (a few nanometers). Nevertheless, the film presents cracking and a top layer that is not aligned. The thickness of the film appears to be limited to 200 nanometers (nm), which is insufficient for fabricating a quarterwave plate or a halfwave plate in the visible.

Furthermore, patent document EP 1 715 365_A1 describes an optical component for liquid crystal display that includes a birefringent thin layer comprising anisotropic mineral particles and a polymer resin.

Document JP-A-2009-104152 describes a birefringent thin film having inorganic nanoparticles and an organic binder.

Finally, document JP-A-2012-032623 describes a method of fabricating a film made up of a polymer resin and oriented mineral particles.

Nevertheless, those various techniques have the drawbacks of producing a film with low birefringence, high diffusion, and/or high absorption in the visible spectrum range, or indeed of presenting defects of uniformity, cracking, or limits in terms of dimensions (thickness, area). Furthermore, fabrication costs make those techniques difficult to apply industrially.

SUMMARY OF THE INVENTION

The object of the invention is to propose fabricating an inorganic birefringent thin film that is inorganic. Another object of the invention is to propose a method of fabricating a birefringent thin film that presents few or no defects (in terms of uniformity, cracking, . . . ) over a large area. Still another object of the invention is to propose an inorganic thin layer optical component that presents high birefringence, good optical transmission, and low diffusion.

The present invention seeks to remedy the drawbacks of prior techniques, and more particularly it provides a method of fabricating a transparent and birefringent mineral solid thin layer, the method comprising the following steps:

a) preparing a colloidal solution constituted by anisotropic mineral nanoparticles in suspension in a dispersion liquid;

b) depositing a liquid thin layer on a surface of a substrate by spreading the colloidal solution as a thin layer while also applying directional shear stress to said colloidal solution tangentially to the surface of the substrate, the value of the shear stress and the concentration of mineral nanoparticles in the colloidal solution being determined in such a manner that the anisotropic mineral nanoparticles become aligned along the direction of the shear stress; and c) drying the liquid thin layer by evaporating the dispersion liquid so as to form a transparent and birefringent mineral solid thin layer.

According to particular and advantageous aspects of the method of the invention:

the mineral nanoparticles have an average length L less than or equal to three micrometers and a ratio of mean length L over mean diameter D that is greater than or equal to two;

the concentration of mineral nanoparticles in the colloidal solution is determined in such a manner that the colloidal solution presents a liquid crystal organization that is nematic, columnar, or smectic;

the dispersion liquid comprises a solvent and/or an additive suitable for increasing the dynamic viscosity of the colloidal solution;

the solvent is a polar solvent having dynamic viscosity greater than or equal to the dynamic viscosity of water; and preferably, the polar solvent is selected from: water, ethylene glycol, propylene glycol, glycerol, the glycol ester family, dimethylsulfoxide, and dimethylformamide, and/or is constituted by a mixture of these polar solvents.

Advantageously, the final composition and/or the viscosity of the colloidal solution for depositing are modified by a step of distilling at least one solvent used for preparing the colloidal solution.

Preferably, during step b) of depositing the liquid thin layer, fabrication method further includes a step of preheating the substrate to a temperature that is less than or equal to the boiling temperature of the dispersion liquid.

Advantageously, after step c) of drying the liquid thin layer, the fabrication method further includes a step of thermal annealing at a temperature lying in the range 100° C. to 1000° C., while preserving the integrity of the nanoparticles and of the substrate.

Advantageously, step b) of depositing a liquid thin layer is performed by dip coating, by spin coating, and/or by blade coating with a knife blade.

In a particular implementation, the dispersion liquid includes at least one precursor for a polymer matrix, so as to obtain a hybrid organo-mineral solid thin layer made up of mineral nanoparticles dispersed in a polymer matrix.

In a particular aspect, after step c) of drying the liquid thin layer, the fabrication method further includes an additional step of depositing a second thin layer on the birefringent solid thin layer by means of a liquid technique using a solution including at least one precursor for a polymer matrix.

The invention also provides an optical component comprising a substrate having a surface and at least one transparent and birefringent mineral solid thin layer deposited on said surface, said transparent and birefringent mineral solid thin layer comprising anisotropic mineral nanoparticles aligned along a direction parallel to the surface of the substrate, the anisotropic mineral nanoparticles having an average length L less than or equal to three micrometers and a ratio of mean length L over mean diameter D that is greater than or equal to two.

In a particular embodiment, the optical component comprises a stack of at least a first transparent and birefringent mineral solid thin layer and a second transparent and birefringent mineral solid thin layer, the first transparent and birefringent mineral solid thin layer comprising anisotropic mineral nanoparticles aligned along a direction parallel to the surface of the substrate, and the second transparent and birefringent mineral solid thin layer comprising anisotropic mineral nanoparticles aligned parallel to the alignment direction of the nanoparticles of the first transparent and birefringent mineral solid thin layer.

In a preferred embodiment, the optical component comprises at least one transparent and birefringent mineral solid thin layer or a stack of transparent and birefringent mineral solid thin layers having a fast optical axis and a slow optical axis, the total thickness of said birefringent thin layer or of the stack of birefringent thin layers being such that the optical component forms a phase retardation plate preferably having optical retardation that is equal to $\lambda/8$, $\lambda/4$, $\lambda/2$, $3\lambda/4$, or $\lambda$ between the fast optical axis and the slow optical axis for a utilization wavelength lying in the UV, visible, or IR range, preferably in the range extending from 200 nm to 3000 nm.

In another particular embodiment, the optical component comprises a stack of at least a first transparent and birefringent mineral solid thin layer having a fast optical axis and a second transparent and birefringent mineral solid thin layer having a slow optical axis, the fast optical axis of the first transparent and birefringent mineral solid thin layer being parallel to the slow optical axis of the second transparent and birefringent mineral solid thin layer so as to form a thin layer dielectric mirror.

The invention finds a particularly advantageous application in the fabrication of thin layer birefringent optical components and in the use of inorganic birefringent thin layers that withstand high temperatures or high photon fluxes, e.g. in video projectors, solar cells, light-emitting diodes (LEDs), or display devices.

The present invention also relates to the characteristics that appear during the following description and that may be considered in isolation or in any technically feasible combination.

BRIEF DESCRIPTION OF THE DRAWINGS

The invention can be better understood and other objects, details, characteristics, and advantages thereof appear more clearly from the following description of one or more particular implementations of the invention given purely by way of non-limiting illustration and with reference to the accompanying drawings. In the drawings:

FIG. 1 is a flow chart showing the steps of fabricating a birefringent thin layer in an implementation of the invention;

FIG. 2 is a side view of a deposition device using a knife blade (for blade coating) to align the anisotropic mineral nanoparticles during thin layer deposition;

DETAILED DESCRIPTION

Figure 3:
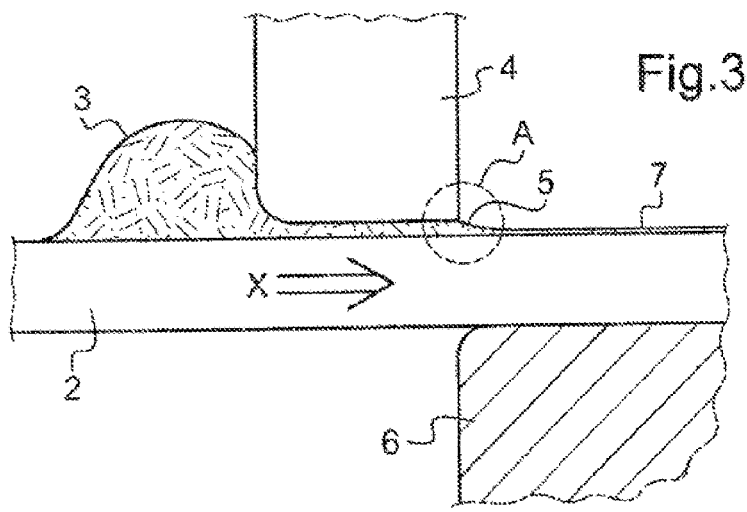
FIG. 3 is a diagram showing thin layer deposition and alignment of anisotropic nanoparticles by applying a shear stress via the knife blade.

Geometrical anisotropy at microscopic or nanoscopic level in a retardation plate layer generally gives rise to optical anisotropy or birefringence. A structure of aligned inorganic nanoparticles is used for fabricating a birefringent inorganic thin layer.

FIG. 1 is a flow chart showing the steps of fabricating a birefringent solid thin layer in an implementation of the invention. Some of the steps are essential, whereas others are optional, as described in detail below.

A prior step 10 consists in preparing or fabricating anisotropic mineral nanoparticles. Advantageously, anisotropic mineral nanoparticles are synthesized chemically using a method that is compatible with mass production. The mineral nanoparticles are preferably crystals and preferably monocrystals. Advantageously, the nanoparticles are constituted by a material presenting intrinsic birefringence and preferably they absorb little or no light in the utilization spectrum range, situated in the range 200 nanometers (nm) to 3000 nm. The anisotropic mineral nanoparticles are preferably in the form of nanorods or nanocylinders or nanoellipsoids. By way of example, methods are known for fabricating nanoparticles of $TiO_2$, of $SiO_2$, or of ZnO. Advantageously, use is made of mineral nanoparticles of $LnPO_4$ (phosphates containing one or more ions from the lathanide series or of yttrium), of alkaline earth carbonates, $TiO_2$, ZnO, FeOOH, and/or a mixture of these anisotropic mineral nanoparticles. In a particular implementation, use is made of nanorods of $LaPO_4$. Advantageously, the anisotropic mineral nanoparticles are transparent in the utilization range of optical wavelengths, e.g. in the UV, visible, and/or infrared range.

Thereafter, the steps 20, 30, and 40 relate to synthesizing a colloidal suspension or a colloidal solution of anisotropic mineral nanoparticles in suspension in a dispersion liquid.

For this purpose, in step 20, a dispersion liquid is prepared that is based on an aqueous or non-aqueous solvent or indeed on a mixture of water and one or more non-aqueous solvents such as ethylene glycol, glycerol, propylene glycol, a compound of the glycol ether family, dimethylsulfoxide, or dimethylformamide. The dispersion liquid is preferably constituted by a polar solvent or a mixture of polar solvents. The term "polar solvent" is used to mean a solvent possessing a large dielectric constant capable of solvating the surfaces of particles and of separating surface electrostatic charges. It can be considered that a solvent is polar when its dielectric constant is preferably greater than ten (where this value does not constitute a bottom limit). There exist both protic polar solvents (interaction by hydrogen bonds) and aprotic polar solvents (presence of a dipole moment and electrostatic interactions). The dispersion liquid presents dynamic viscosity that is greater than or equal to that of water.

During step 30, the anisotropic mineral nanoparticles are dispersed in the dispersion liquid. After the nanoparticles have dispersed in the solvent, a colloidal solution is thus obtained in step 40, which solution is the result of step 30.

Advantageously, the composition of the dispersion liquid and the concentration of anisotropic inorganic nanoparticles in the colloidal solution are optimized so that the colloidal solution is stable over time. The concentration of anisotropic mineral nanoparticles in the colloidal solution is preferably high. In preferred manner, the concentration of anisotropic mineral nanoparticles in the colloidal suspension is greater than or equal to 0.1% in volume fraction. For example, the concentration of $LaPO_4$ nanoparticles in the colloidal suspension is greater than or equal to 0.1% in volume fraction. This colloidal suspension is particularly stable over time and can be stored for several months at ambient temperature.

Advantageously, the ratio of the mean length L over the mean diameter D of the anisotropic mineral nanoparticles is greater than or equal to 2, and the concentration $\phi_s$ in volume fraction of mineral nanoparticles in the colloidal suspension is greater than or equal to 0.1%. Preferably, the concentration $\phi_s$ of mineral nanoparticles is adjusted to a value that leads to the colloidal solution being organized in nematic, columnar, or smectic manner.

As described in greater detail below, a suspension with a volume fraction of about 5% of $LaPO_4$ makes it possible to obtain thin layers of varying thickness (200 nm to 1 micrometer (μm)) presenting birefringence of 0.13.

Use is made of the alignment properties of the anisotropic nanoparticles under flow conditions (detection of flow birefringence by using crossed polarizers). In the present document, the term "liquid crystal" is used to designate the material state that possesses simultaneously the properties of a crystal solid (spatial anisotropy of physical properties) and the properties of liquids (fluidity, drops coalescening by contact, etc.). Under the effect of applying a tangential shear stress to the surface of the substrate, the nanoparticles tend automatically to become aligned along the shear stress direction. The colloidal suspension needs to present flow birefringence properties so that while the thin layer is being deposited, the particles become oriented in the shear stress direction. The main parameters associated with the behavior of the colloidal suspension and that determine the quality of the thin layer from the point of view of nanoparticle orientation, are as follows:

the ratio of length over diameter (aspect ratio) for the anisotropic nanoparticles lies in the range 2 to 1000;

the concentration $\phi_s$ in volume fraction of anisotropic nanoparticles in the colloidal suspension lies in the range 0.1% to 50%;

the colloidal suspension is stable for at least 2 hours (h) after the suspension has been prepared; and the viscosity of the colloidal suspension is not less than that of water.

The stability of the colloidal suspension may be evaluated over time, e.g. by monitoring the size of diffusing objects as measured by dynamic diffusion of light.

Viscosity depends in particular on the composition of the dispersion liquid. The dispersion liquid is selected as a function of its viscosity and of its affinity for the nanoparticles. In an implementation, a dispersion liquid is used that is based on water and ethylene glycol. It is possible to use a high-viscosity additive such as glycerol in order to increase the viscosity of the colloidal suspension and encourage orientation caused by shear on the nanoparticles. The viscosity of water is equal to $8.94E^{-4}$ Pascal seconds (Pa·s), the viscosity of ethylene glycol is equal to $1.61E^{-2}$ Pa·s, and the viscosity of glycerol is equal to 1.2 Pa·s at 20° C.

Optionally, in step 50, it is possible to measure the properties of the colloidal suspension: its concentration, optical diffusion, and viscosity.

Prior to proceeding with depositing the colloidal suspension, it is verified that it presents, at least locally, properties of flow birefringence or liquid crystal properties.

Step 60 is an optional step of modifying the composition of the colloidal suspension so as to optimize its properties of flow birefringence. When the colloidal solution containing the inorganic anisotropic nanoparticles is entirely in the form of a diluted isotropic phase and does not present large flow birefringence, it is possible to modify the concentration of nanoparticles, and the concentration and/or the composition of the solvent. For example, if the viscosity of the colloidal suspension is insufficient for completely aligning the nanoparticles by spreading the deposit, it is possible to add one or more solvents suitable for increasing the viscosity of the colloidal suspension. Advantageously, the colloidal suspension is distilled so as to eliminate water from the solvent. This produces a colloidal suspension of inorganic anisotropic nanoparticles that present good properties of flow birefringence, e.g. having at least a fraction in the liquid crystal state presenting permanent birefringence. This birefringence property may easily be revealed by placing a cell containing the colloidal suspension between crossed polarizers. The composition of the colloidal solution is adjusted finely so as to obtain a solution comprising the liquid crystal phase.

Thus, at the end of steps 10 to 40, 50 or 60, a colloidal suspension or solution of nanoparticles has been synthesized, which suspension presents birefringence properties.

When the colloidal solution includes a fraction in the liquid crystal state, this fraction includes mesophases induced by the presence of the solvent and that depend on concentration. The anisotropic inorganic nanoparticles make it possible to generate liquid crystal phases in the presence of the solvent under certain conditions of concentration, of viscosity, and of temperature.

The fine adjustment of the birefringence behavior of the colloidal suspension of nanoparticles then makes it possible to orient the nanoparticles while they are being deposited as a liquid thin layer. A colloidal suspension of liquid crystal type nanoparticles tends to become oriented automatically when shear stress is applied to the liquid crystal. The orientation order of the aligned phase is approximately proportional to the viscosity of the suspension.

Thereafter (step 70), the colloidal suspension is deposited as a liquid thin layer on a substrate and shear stress is applied between the substrate and the colloidal suspension while it is being deposited.

Various deposition techniques make it possible to apply shear stress during deposition of a liquid thin layer: spin coating; dip coating; blade coating; or indeed spreading by means of a brush or a roller. It is thus possible from a high viscosity colloidal suspension mineral nanoparticles to obtain a liquid film structure of anisotropic mineral nanoparticles that is aligned along the shear stress direction and that is thus aligned parallel to the surface of the substrate.

Step 80 comprises a step of drying the liquid thin layer by evaporating the dispersion liquid. The substrate is preferably raised to a temperature higher than or equal to the boiling temperature of the dispersion liquid. Thus, at the end of step 80, a solid thin layer is obtained that is birefringent and transparent, and that comprises mineral nanoparticles aligned in a direction that is parallel to the surface of the substrate.

Step 90 is an optional step of thermally annealing the birefringent mineral solid thin layer.

FIG. 2 is a side view of a deposition device using a knife blade (to perform blade coating) in order to apply a shear stress in such a manner as to align the anisotropic mineral nanoparticles. A substrate 2 is placed on a sample carrier 1. Advantageously, the substrate 2 is of planar shape. For example, the substrate 2 may be a glass or quartz plate having a surface area that may lie in the range a few square micrometers to a few square meters ($m^2$). In a preferred implementation, the sample carrier 1 is plane and includes means for heating the substrate (e.g. a heater resistance) and means for measuring the temperature of the substrate. The substrate 2 has a top surface on which there is deposited a determined quantity of colloidal suspension 3 of anisotropic mineral nanoparticles including at least a fraction in the liquid crystal state. A few drops of colloidal suspension 3 can suffice for depositing a thin layer having a thickness of several hundred micrometers and a large area. The substrate is preheated to a temperature (T≈140° C.) that is lower than the evaporation temperature of the dispersion liquid. A knife blade 4 is arranged on a plane extending transversely relative to the surface of the substrate, with the tip of the blade being situated at a small distance d from the plane of the surface of the substrate 2. Typically, the distance $\underline{d}$ lies in the range 10 µm to 100 µm. Controlling the distance $\underline{d}$ enables the thickness of the deposited thin layer to be controlled. The substrate 2 and the knife blade 4 are caused to perform a relative movement X so that the knife blade comes into contact with the colloidal suspension 3. The knife blade 4 spreads the colloidal suspension so as to form a liquid thin layer of uniform thickness on the surface of the substrate 2. Simultaneously, the knife blade 4 applies shear stress to the colloidal suspension 3, which stress is directed in the plane of the substrate.

The knife blade 4 may be trapezoidal in shape or it may be rectangular with rounded corners. Advantageously, the edge of the knife blade 4 is parallel to the surface of the substrate on which the colloidal suspension is deposited. The knife edge may be in the form of a line or in the form of a plane surface.

In an implementation, the knife blade 4 is stationary and the substrate moves at a constant speed in order to pass under the knife blade 4 at an accurately controlled distance d. Alternatively, the knife blade 4 may move while the sample carrier remains stationary.

FIG. 3 is a diagram showing a liquid thin layer being deposited and showing the anisotropic nanoparticles being aligned by applying shear stress via the knife blade 4. The knife blade 4 is situated at a distance $\underline{d}$ from the plane of the surface of the substrate 2. Advantageously, the knife blade is flat in shape so as to enable the shear zone to be enlarged. The colloidal suspension 3 prepared using the above-described method presents birefringence properties. Advantageously, the colloidal suspension 3 includes phases that are intermediate between the gel state and the nematic liquid crystal state. Applying shear stress to the colloidal suspension by means of the knife blade 4 serves simultaneously to spread the colloidal suspension as a liquid thin layer 5 and to align nanoparticles in the liquid thin layer 5 in a direction parallel to the shear stress. After the blade 4 has passed, a liquid thin layer 5 is thus obtained that has nanoparticles oriented parallel to the surface of the substrate in the direction of the shear stress. Thereafter, the substrate 2 passes onto a heater device 6 that raises the substrate to a temperature higher than the evaporation temperature of the dispersion liquid. The dispersion liquid is thus evaporated from the liquid thin layer 5, thereby enabling the mineral thin layer of aligned anisotropic nanoparticles to be solidified. This produces a birefringent mineral solid thin layer 7.

Figure 4:
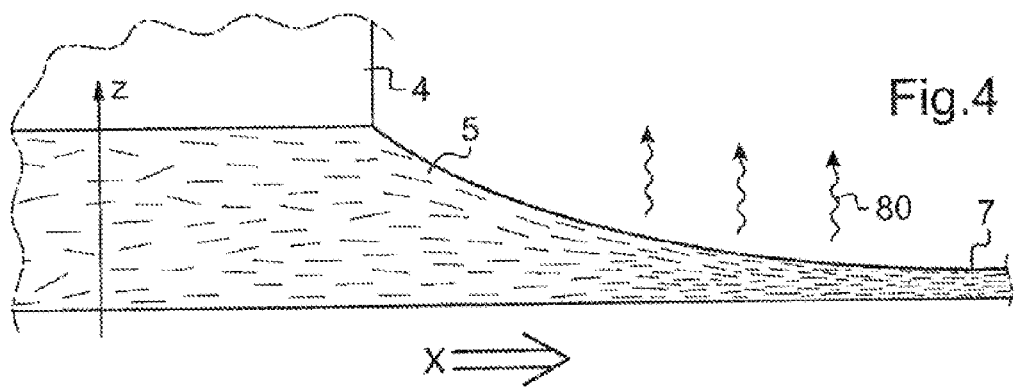
FIG. 4 is a diagrammatic enlarged view of the portion circled in FIG. 3.

FIG. 4 is a diagrammatic enlarged view of the encircled portion A in FIG. 3. During the relative displacement X between the blade 4 and the substrate 2, the colloidal suspension is subjected to a shear stress that is represented in FIG. 4 by single-headed arrows. The anisotropic mineral nanoparticles, represented by short lines, are arranged in superposed molecular layers and they are oriented parallel to the surface of the substrate along the direction of the shear stress. Immediately after the knife blade 4 has passed, the thin layer 5 remains in the liquid state because of the presence of the dispersion liquid. Advantageously, in the zone where the liquid thin layer 5 is deposited, the substrate is raised to a temperature a little higher than the boiling temperature of the dispersion liquid (T≈200° C.) so as to solidify the thin layer of mineral nanoparticles that are aligned in the direction of the applied shear stress. During evaporation of the dispersion liquid, the nanorods conserve their orientation. This produces a solid thin layer 7 of anisotropic mineral nanoparticles that are aligned in a common direction parallel to the substrate. Thereafter, a thermal annealing step 80 is preferably performed on the thin layer 7 of oriented anisotropic nanoparticles. For example, the substrate 2 and the solid thin layer 7 are annealed in an oven at a temperature higher than 500° C. The thermal annealing temperature is selected so as to preserve the integrity of the substrate and of the solid thin layer of mineral nanoparticles. The thermal annealing serves to consolidate the mechanical structure of the birefringent solid thin layer 7.

Preferred Implementation

By way of preferred example, use is made of $LaPO_4$ nanorods. As mentioned above, all kinds of particles having an anisotropic shape could be used (e.g. $TiO_2$, ZnO, FeOOH).

The principle of aligning the nanorods relies on using the liquid crystal (LC) properties of a well stabilized anisotropic colloidal solution, which tends to become flow oriented under shear stress.

The following four main parameters are associated with the liquid crystal behavior that determines the quality of the thin layer and its orientation:

1) ratio of length over diameter of the anisotropic particles;
2) volume fraction of the colloidal solution;
3) stability of the colloidal solution; and
4) viscosity of the colloidal solution.

The dispersion liquid is selected by considering its viscosity and its affinity with the colloidal particles. In this example, use is made of water and ethylene glycol, and a high-viscosity fluid such as glycerol may be used as an additive for increasing viscosity and for facilitating the orientation of the nanorods as induced by shear.

The viscosity values are as follows:
water=$8.94E^{-4}$ Pa·s;
ethylene glycol=$1.61E^{-2}$ Pa·s; and
glycerol=1.2 Pa·s.

For deposition purposes, it is possible to use spin coating or dip coating methods.

Preferred Method

1. Prepare a suspension of mineral anisotropic colloidal nanoparticles with a high concentration of nanoparticles (>0.1% volume fraction).
2. Deposit one or more drops of the prepared colloidal suspension on a substrate (plate of glass or quartz) onto which the thin layer is to be deposited.
3. Place the substrate on a plate forming the base body of the deposition machine.
4. Cause the knife blade to pass automatically directly over the substrate at constant speed and at a small controlled distance from the surface of the substrate. Alternatively, the substrate may be moved instead of the blade.
5. The deposited liquid solution is spread by the blade so as to form a homogeneous liquid thin layer on the substrate.
6. Evaporate the solvent by heating the plate so as to form a solid thin layer of aligned nanorods.
7. If necessary for mechanical stability, it is possible to anneal the solid thin layer in an oven at above 500° C. without loss of optical quality.

When the shear stress is applied throughout deposition in a single direction and with constant intensity, a birefringent mineral thin layer is obtained that is uniform in thickness and in birefringence.

In a first variant, it is possible to modify the direction and/or the intensity of the shear force during deposition so as to fabricate a thin layer of varying thickness and/or varying birefringence. For this purpose, it suffices to modify the distance d between the knife blade and the surface of the substrate, or to modify the speed at which the substrate moves.

In another variant, deposition is performed by spin coating. A determined quantity of colloidal suspension presenting birefringent properties is deposited on a preferably plane substrate 2. The substrate 2 is placed on a turntable. Advantageously, the turntable includes means for heating the substrate. The turntable is set into motion at a determined speed of rotation. The rotation induces radial shear stress serving simultaneously to spread the colloidal suspension as a liquid thin layer and to orient the anisotropic nanoparticles radially. After the solvent has evaporated (at ambient temperature, or advantageously by heating the substrate to a temperature higher than the evaporated temperature of the solvent), a solid thin layer of radially oriented mineral nanoparticles is obtained. A mineral thin layer is thus fabricated with radial birefringence. By way of illustrative example, a layer has been fabricated in this way having a thickness of 500 nm and constituted by aligned nanorods of lathanum phosphate ($LaPO_4$). Using a scanning electron microscope, it has been found that the nanoparticles are aligned in almost perfect manner parallel to the surface of the substrate and radially to the axis of rotation. The surface is found to be uniform and without cracking. The existence of a few defects at microscopic scale does not harm macroscopic optical quality. By placing the solid thin layer between crossed polarizers, a cross-shaped image can be observed representative of the radial birefringence of the film deposited by spin coating.

In yet another variant, the deposit is prepared by dip coating. A substrate of arbitrary shape is dipped in a vessel containing the colloidal suspension and including at least one phase in the liquid crystal state. Thereafter the substrate is removed from the colloidal suspension. While the substrate is being pulled out, gravity causes a liquid thin layer to form on the substrate, the liquid thin layer being subjected to shear stress that is locally parallel to the surface of the substrate. The nanoparticles automatically become aligned parallel to the shear stress, i.e. parallel to the pulling axis. After the dispersion liquid has evaporated, a birefringent solid thin layer is obtained. The dipping method is particularly well adapted to a substrate having a surface of non-planar shape, such as for example a concave or convex face of a mirror or of a lens.

Other deposition techniques that give rise to shear can also be used. Mention may be made of brush coating used to deposit and orient organic liquid crystals.

The method of deposition with a knife blade advantageously makes it possible to control accurately the thickness of the deposited thin layer. A quarterwave plate has thus been made having a thickness of 450 nm and a halfwave plate has been made having a thickness of one micrometer using the method of the invention.

Figure 5:
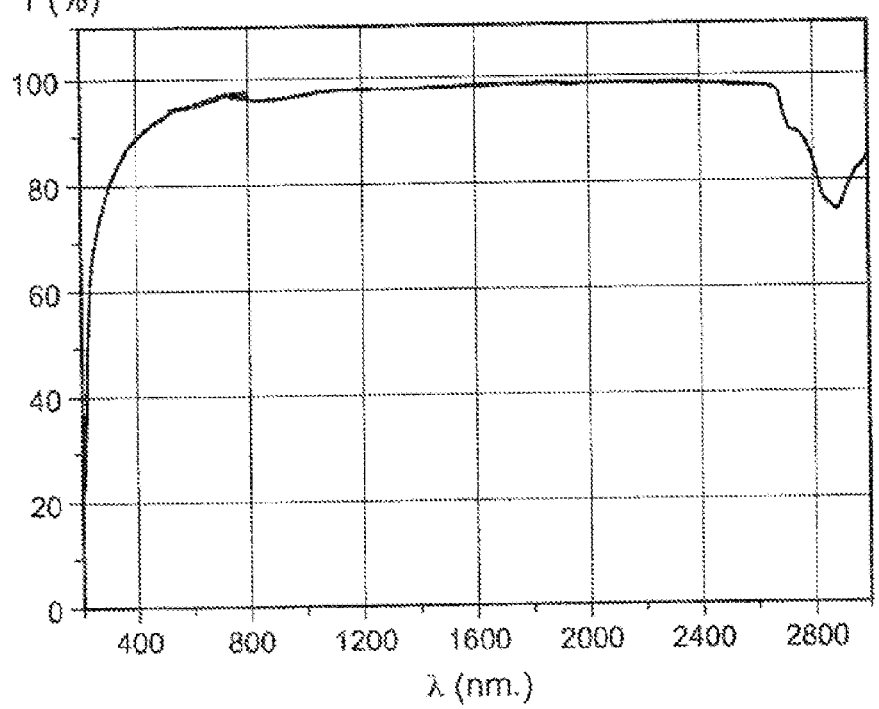
FIG. 5 shows an experimental measurement of transmission through an optical component having a birefringent mineral thin layer over a spectral range going from the UV to the near infrared.

FIG. 5 shows an experimental transmission measurement in the spectral range going from UV to the near infrared through a component having a birefringent mineral thin layer of $LaPO_4$ nanorods. The measured component was a quarterwave plate for a wavelength of 280 nm. The measured transmission indicates that the thin layer is very transparent (T>90%) over the entire visible and near infrared range from 400 nm to 2600 nm. In the ultraviolet, the birefringent thin layer presents remarkable transparency up to ≈300 nm, with a transmission coefficient greater than 80%. At the two ends of the measured spectrum, the transmission coefficient decreases progressively, without presenting an absorption band.

More precisely in the present document, the transparency criterion is defined not only by the transmission coefficient, but also by the diffusion of the birefringent thin layer. In the preferred spectral utilization range, extending from 200 nm to 3000 nm, the intensity of an incident light beam is written $I_0$, the intensity of a transmitted light beam is written $I_T$, the intensity of a reflected light beam is written $I_R$, the intensity of an absorbed light beam is written $I_A$, and the intensity of a diffused light beam is written $I_D$. Since energy is conserved, at any wavelength $\lambda$, the values of $I_0$, $I_T$, $I_R$, $I_A$, and $I_D$ satisfy the following relationship:

$$I_0 = I_T + I_R + I_A + I_D$$

The optical diffusion D is defined at the wavelength as follows:

$$D = \frac{I_D}{I_0}$$

Preferably, the optical diffusion of a birefringent mineral thin layer having a thickness e in nanometers, at the wavelength, is such that in the spectral range under consideration:

$$D \leq 1 - 0.9 \times \exp\left[-\left(\frac{250}{\lambda}\right)^4 \frac{e}{500}\right]$$

Figure 6:
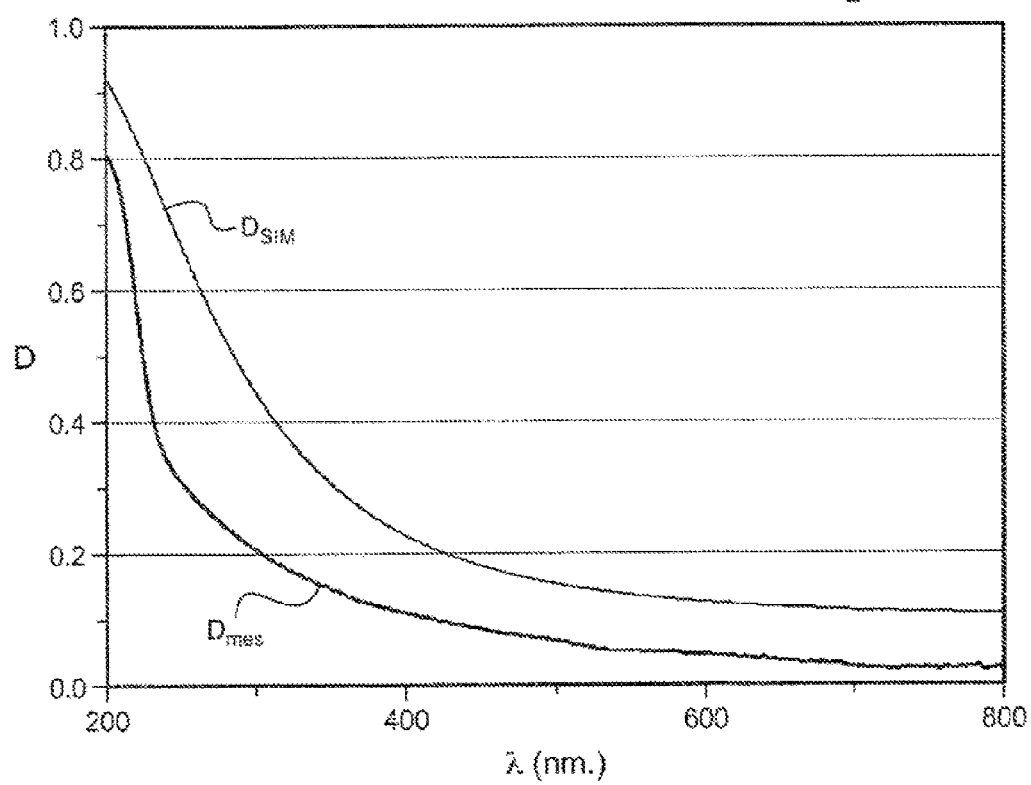
FIG. 6 shows normalized optical diffusion spectral curves for a birefringent mineral solid thin layer (as measured and as simulated)

FIG. 6 shows an experimental measurement curve ($D_{mes}$) for the diffusion of a birefringent mineral thin layer of $LaPO_4$ having a thickness of 500 nm as obtained by the method of the invention, and a simulation curve ($D_{SIM}$) for a birefringent thin layer having a thickness of 500 nm.

Figure 7:
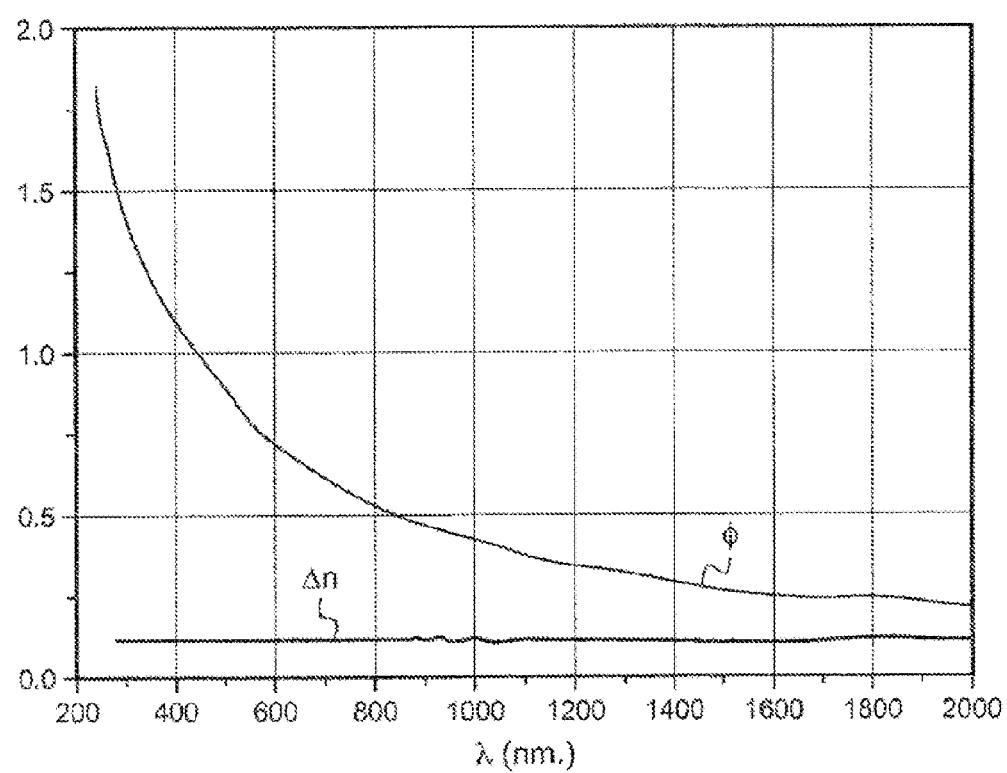
FIG. 7 shows measured birefringence (Δn) and optical retardation (φ) for a birefringent mineral thin layer in a spectrum range going from UV to the near infrared.

FIG. 7 shows an experimental measurement of the spectrum of the birefringence ($\Delta n$) and of the optical retardation ($\phi$) of a component having a birefringent mineral thin layer. The abscissa axis represents the measurement wavelength $\lambda$ going from UV to the near infrared ($\approx 2280$ nm–2000 nm). The ordinate axis represents the measured value of the birefringence ($\Delta n$) and also the value of the optical retardation ($\phi$ in radians). It can be seen that the birefringent solid thin layer presents strong birefringence $n \approx 0.12$. Furthermore, the birefringence is practically constant over the entire spectral range extending from UV to the near infrared. The birefringent thin layer thus presents the advantage of being achromatic. By comparison, a block of calcite presents birefringence of value that varies strongly over the UV—visible range. The optical retardation $\phi$ of the thin layer component is easily calculated from the thickness e of the thin layer and from the measured birefringence $\Delta n$, as follows:

$$\varphi = \frac{\Delta n \times e}{\lambda}$$

To summarize, an optical component including a birefringent mineral thin layer presents a high coefficient of transmission (greater than 70%) and measured birefringence that is equal to $\approx 0.1$ over a wide spectral range: UV —visible— near infrared. The high value of the birefringence makes it possible to envisage various applications.

A first application relates to a wave plate used for controlling the transmission of polarized light in a video projector.

Advantageously, the deposition method may be applied to a wide variety of substrates. The deposition technique by blade coating is particularly well adapted for a substrate that is plane. Likewise, the deposition technique by spin coating is generally applied to a substrate that is plane. The deposition technique by dip coating applies to substrates of any shape, whether plane or not. Various substrate materials can be envisaged: glass, quartz, rigid polymer, or flexible polymer. The substrate must be compatible with the method, and in particular with the temperature of the substrate during deposition and during evaporation of the solvent.

In a particular application, it is possible to deposit a stack of several thin layers of anisotropic mineral nanoparticles. In a first variant, the stacked thin layers are all oriented in the same direction. The various thin layers may be fabricated using the same colloidal suspension in order to increase the final thickness of the stack and thus to increase the optical retardation of the birefringent optical component. In another variant, a first birefringent thin layer is deposited with the anisotropic mineral nanoparticles of the first layer being oriented in a first direction, and a second thin layer is deposited on the first thin layer, the anisotropic mineral nanoparticles of the second layer being oriented in a direction that is different from the direction of the first layer. It is thus possible to fabricate a thin layer dielectric mirror.

In a particular implementation, after the solvent has evaporated, the thin layer of oriented mineral nanoparticles is encapsulated in a transparent thin layer of polymer or mineral material. For example, a liquid technique is used to deposit a thin layer comprising at least one precursor for a polymer matrix, so as to obtain a mineral solid thin layer made up of nanoparticles dispersed in a polymer matrix. Encapsulation by a polymer fills in the voids between the anisotropic mineral nanoparticles and forms a uniform thin layer with a plane surface. Encapsulation makes it possible to reduce the diffusion induced by the nanoparticles and imparts greater mechanical and chemical strength.

The invention makes it possible to fabricate a thin layer (having thickness lying in the range a few nanometers to 1 µm or 2 µm) that is completely inorganic, being constituted by mineral nanoparticles that are aligned while being deposited. This thin layer presents very advantageous birefringence optical properties with high birefringence ($\Delta n \approx 0.13$) for layers that are very thin (thickness of about 500 nm). The anisotropic shape of the aligned nanoparticles makes it possible to obtain a high birefringent value $\Delta n$, up to $\Delta n \approx 0.13$, while presenting low absorption and thus a high transmission value. After deposition, birefringence remains constant.

Furthermore, since the $LaPO_4$ material is a material having a large gap, it does not absorb over the UV—visible range, unlike conventional organic polymers. The inorganic thin layer of anisotropic mineral nanoparticles presents low diffusion losses (<10%).

The aligned film structure is generated by the liquid crystal property (orientation induced by shear stress) during deposition of the nanoparticles. It is preferable to use a non-aqueous solvent in order to increase the effect of orientation induced by shear stress.

The method of the invention makes it possible to produce a strongly birefringent thin layer that diffuses little and that absorbs little in the UV—visible—infrared spectrum range. The birefringent inorganic thin layer may be fabricated industrially as a thin layer of uniform thickness over a large area, which need not necessarily be plane.

The birefringent thin layer is constituted solely by inorganic materials, thereby making it very stable, in particular with temperature, and highly resistant to difficult conditions such as exposure to a large flux of photons.

The invention makes it possible to fabricate a wave plate, or a retardation plate, using a high quality inorganic thin layer of controlled thickness over a large area and without defects such as cracks.

The method is inexpensive and is applicable to roller coating devices. Deposition techniques with a shear effect are simple. The substrate does not require any surface texturing prior to deposition. A birefringent inorganic layer as obtained in this way can be used as a wave plate suitable for being exposed to high temperatures or to a large flux of photons, such as in a video projector, a solar cell, a light-emitting diode (LED), or a display device.

The invention claimed is:

1. An optical component comprising a substrate (2) having a surface and a stack of at least a first mineral solid thin layer (7) that is transparent and birefringent deposited on said surface and a second transparent and birefringent mineral solid thin layer, the first mineral solid thin layer that is transparent and birefringent comprising anisotropic mineral nanoparticles aligned along a direction parallel to the surface of the substrate, and the second transparent and birefringent mineral solid thin layer comprising anisotropic mineral nanoparticles aligned parallel to the alignment direction of the nanoparticles of the first transparent and birefringent mineral solid thin layer, the anisotropic mineral nanoparticles having an average length L less than or equal to three micrometers and a ratio of mean length L over mean diameter D that is greater than or equal to two.

2. The optical component according to claim 1, comprising stack of transparent and birefringent mineral solid thin layers having a fast optical axis and a slow optical axis, the total thickness of the stack of birefringent thin layers being such that the optical component forms a phase retardation plate having optical retardation that is equal to $\lambda/8$, $\lambda/4$, $\lambda/2$, $3\lambda/4$, or $\lambda$ between the fast optical axis and the slow optical axis for a utilization wavelength A lying in the UV, visible, or IR range.

3. The optical component according to claim 1, comprising a stack of at least a first mineral solid thin layer (7) that is transparent and birefringent having a fast optical axis and a second transparent and birefringent mineral solid thin layer having a slow optical axis, the fast optical axis of the first transparent and birefringent mineral solid thin layer being parallel to the slow optical axis of the second transparent and birefringent mineral solid thin layer so as to form a thin layer dielectric mirror.

4. The optical component according to claim 2, wherein the utilization wavelength λ lies in the range extending from 200 nm to 3000 nm.

5. A method of fabricating a transparent and birefringent mineral solid thin layer, the method comprising the following steps:
   a) preparing (10, 20, 30, 40, 50, 60) a colloidal solution (3) constituted by anisotropic mineral nanoparticles in suspension in a dispersion liquid;
   b) depositing (70) a liquid thin layer on a surface of a substrate (2) by spreading the colloidal solution (3) as a thin layer while also applying directional shear stress to said colloidal solution tangentially to the surface of the substrate (2), the value of the shear stress and the concentration of mineral nanoparticles in the colloidal solution being adjusted in such a manner that the anisotropic mineral nanoparticles become aligned along the direction of the shear stress; and
   c) drying the liquid thin layer by evaporating (80) the dispersion liquid from said liquid thin layer so as to form a mineral solid thin layer (7) that is transparent and birefringent.

6. The method of fabricating a birefringent solid thin layer according to claim 5, wherein the mineral nanoparticles have an average length L less than or equal to three micrometers and a ratio of mean length L over mean diameter D that is greater than or equal to two.

7. The method of fabricating a birefringent solid thin layer according to claim 6, wherein the concentration of mineral nanoparticles in the colloidal solution is adjusted in such a manner that the colloidal solution presents a liquid crystal phase that is nematic, columnar, or smectic.

8. The method of fabricating a birefringent solid thin layer according to claim 5, wherein the dispersion liquid comprises a solvent and/or an additive suitable for increasing the dynamic viscosity of the colloidal solution.

9. The method of fabricating a birefringent solid thin layer according to claim 8, wherein the solvent is a polar solvent having dynamic viscosity greater than or equal to the dynamic viscosity of water, the polar solvent being selected from the group consisting of: water, ethylene glycol, propylene glycol, glycerol, the glycol ester family, dimethylsulfoxide, and dimethylformamide, and/or is constituted by a mixture of these polar solvents.

10. The method of fabricating a birefringent solid thin layer according to claim 8, wherein the final composition and/or the viscosity of the colloidal solution for depositing are modified by a step of distilling at least one solvent used for preparing the colloidal solution.

11. The method of fabricating a birefringent solid thin layer according to claim 5, further including, during step b) of depositing (70) the liquid thin layer (5), a step of preheating the substrate to a temperature that is less than or equal to the boiling temperature of the dispersion liquid.

12. The method of fabricating at least one birefringent solid thin layer according to claim 5, the method further including, after step c) of drying the liquid thin layer, a step of thermal annealing (90) at a temperature lying in the range 100° C. to 1000° C., while preserving the integrity of the nanoparticles and of the substrate.

13. The method of fabricating a birefringent solid thin layer according to claim 5, wherein step b) of depositing (70) a liquid thin (5) layer is performed by dip coating, by spin coating, and/or by blade coating with a knife blade (4).

14. The method of fabricating a birefringent solid thin layer according to claim 5, wherein the dispersion liquid includes at least one precursor for a polymer matrix, so as to obtain, after drying the liquid thin layer (5) by evaporating the dispersion liquid from said liquid thin layer in step c), a hybrid organo-mineral solid thin layer made up of mineral nanoparticles dispersed in a polymer matrix.

15. The method of fabricating a birefringent solid thin layer according to claim 5, further including, after step c) of drying the liquid thin layer, an additional step of depositing a second thin layer on the birefringent solid thin layer by means of a liquid technique using a solution including at least one precursor for a polymer matrix, so as to obtain a mineral solid layer made up of nanoparticles dispersed in a polymer matrix.

* * * * *